United States Patent
Fuehrer

(10) Patent No.: US 9,784,378 B1
(45) Date of Patent: Oct. 10, 2017

(54) GATE VALVE FOR USE WITH A GRAIN BIN

(71) Applicant: Malrie F. Fuehrer, York, NE (US)

(72) Inventor: Malrie F. Fuehrer, York, NE (US)

( * ) Notice: Subject to any disclaimer, the term of this patent is extended or adjusted under 35 U.S.C. 154(b) by 0 days.

(21) Appl. No.: 15/089,797

(22) Filed: Apr. 4, 2016

(51) Int. Cl.
  *B65G 69/04* (2006.01)
  *F16K 15/03* (2006.01)
  *A01F 25/14* (2006.01)
  *A01F 25/22* (2006.01)

(52) U.S. Cl.
  CPC ............ *F16K 15/035* (2013.01); *A01F 25/14* (2013.01); *A01F 25/22* (2013.01); *B65G 69/0441* (2013.01)

(58) Field of Classification Search
  CPC ...... F16K 15/035; F16K 15/023; F16K 15/03; B65G 69/0441; A01F 25/14; A01F 25/22
  USPC ............................ 137/527, 512, 527.6, 527.8
  See application file for complete search history.

(56) References Cited

U.S. PATENT DOCUMENTS

| 3,331,391 | A | * | 7/1967 | McRdinyan | F16K 15/03 137/527 |
| 3,590,858 | A | * | 7/1971 | Martin | B63J 2/10 137/493.3 |
| 4,159,151 | A | * | 6/1979 | Wood | B65G 69/0441 406/162 |
| 5,201,685 | A | * | 4/1993 | Raisanen | A01K 1/0058 137/527.8 |

\* cited by examiner

*Primary Examiner* — Kevin Lee
*Assistant Examiner* — P. Macade Nichols
(74) *Attorney, Agent, or Firm* — Dennis L. Thomte; Thomte Patent Law Office LLC

(57) ABSTRACT

A gate valve for positioning in the open upper end of a grain bin below the lid thereof which closes the open upper end of the grain bin. The gate valve permits grain to pass downwardly therethrough but which prevents warm moist air from the grain bin from passing upwardly therethrough into a grain spout or deadhead box.

4 Claims, 6 Drawing Sheets

GATE VALVE FOR USE WITH A GRAIN BIN

BACKGROUND OF THE INVENTION

Field of the Invention

This invention relates to a gate valve for use in the upper end of a grain bin and more particularly to a gate valve for use in the upper end of a grain bin which prevents warm moist air from passing upwardly through the upper end of the grain bin into a grain discharge spout which is in communication with a source of grain.

Description of the Related Art

Many types of grain distribution systems have been previously provided wherein a plurality of grain bins are fairly closely positioned to one another with a grain distributor or the like supplying grain to each of those grain bins. Usually, a grain discharge spout extends from the grain distributor to each of the grain bins with the discharge end of each of the spouts being in communication with the open upper end of the grain bin to supply grain to the bin. In many cases, the lower end of the spouts have an adjustable deadhead box secured thereto which is in communication with the open upper end of the bin. In those cases where the grain bin is of the dryer type or the aerator type, air is forced upwardly through the grain in the bin. Most of the grain bins have vents formed in the roofs thereof through which warm moist air from the grain in the bin passes outwardly and upwardly therefrom. However, a portion of the warm moist exhaust air is also directed upwardly into the discharge end of the grain discharge spout or the adjustable deadhead box. Due to the fact that warm air has a higher moisture holding capacity than cool air, the warm moist air that the aeration fan of the bin pushes upwardly out of the grain, some of the warm moist air passes outwardly through vents in the roof of the bin and some passes through the hole in the lid of the bin. When the warm moist air passes upwardly through the cool discharge spout, water condenses on the inside of the discharge spout. The condensed water on the inside of the discharge spout drips downwardly from the discharge spout into the center of the grain bin thereby causing the grain in the center of the bin to spoil. Further, the water dripping downwardly from the discharge spout can migrate down to the bottom of the bin thereby causing the center well to have spoiled grain to plug the center well or to ice up if the grain is unloaded in freezing conditions.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A gate valve is disclosed for use with a grain bin having a grain inlet opening at its upper end which has a lid extending over the grain inlet opening. The lid has an opening formed therein which is in communication with a grain discharge spout or deadhead box with the grain discharge spout or deadhead box being in communication with a source of grain from a grain distributor or the like. The gate valve of this invention includes a hollow housing having an open upper end, an open lower end, and an interior. The housing is secured to and is positioned at the lower side of the lid whereby the open upper end of the housing is in communication with the opening in the lid. A valve assembly is mounted on the housing at the lower open end thereof which is movable between a normally closed position and an open position. The valve assembly closes the open lower end of the housing when in its normally closed position to prevent warm moist air from passing upwardly from the grain in the grain bin into the grain discharge spout. The valve assembly is moved from its normally closed position to its open position upon grain passing downwardly from the grain discharge spout or deadhead box into the housing and which comes into contact with the valve assembly.

It is therefore a principal object of the invention to provide a gate valve for use with a grain bin which prevents warm moist air from passing upwardly from the bin into a grain discharge spout.

A further object of the invention is to provide a gate valve of the type described which is easily secured to an existing lid of a grain bin.

A further object of the invention is to provide a gate valve of the type described which is in an open position when grain is being discharged into the grain bin and which is closed when grain is not being discharged into the grain bin to prevent warm moist air from the grain bin from passing upwardly into a grain discharge spout or deadhead box.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
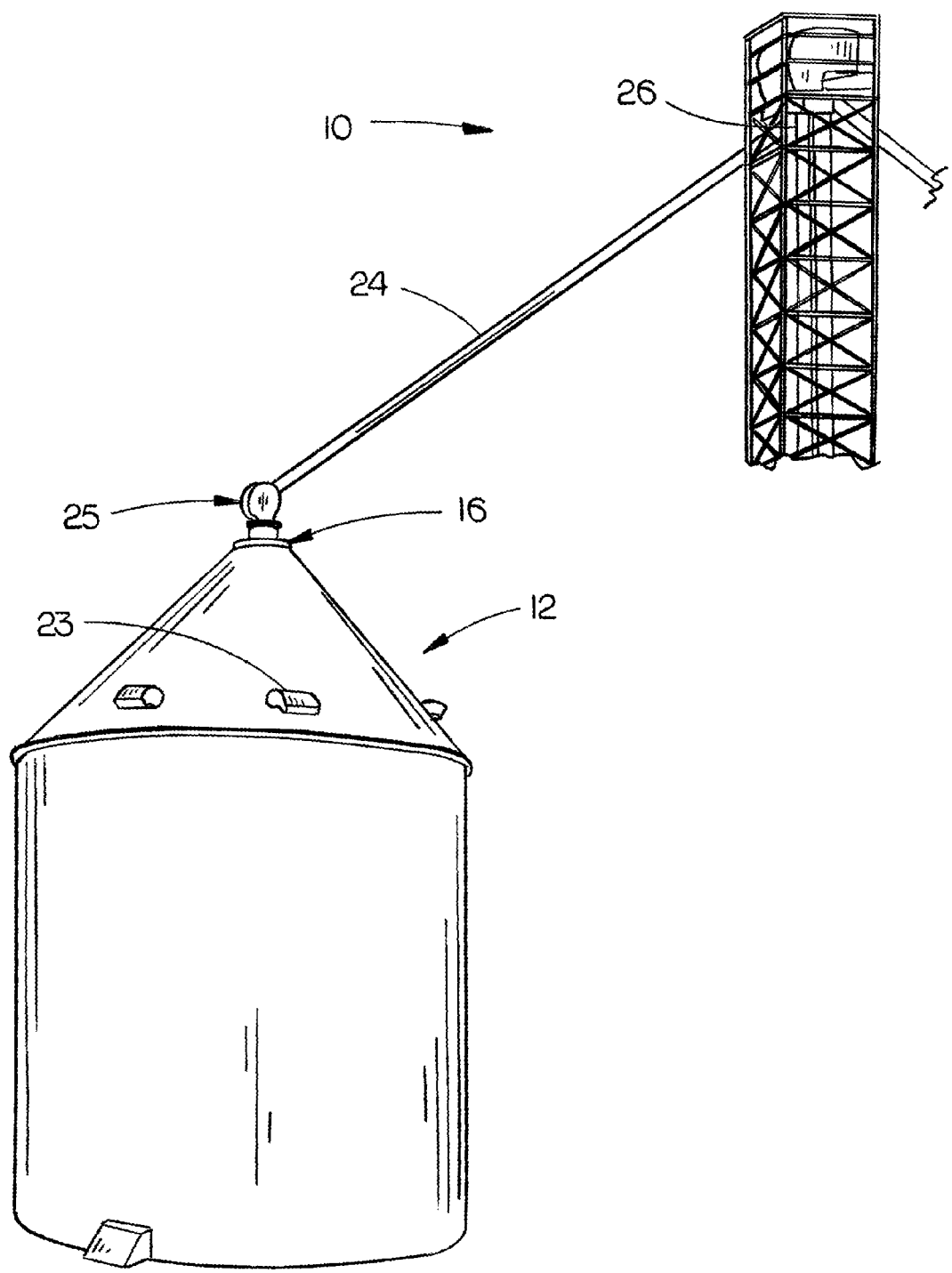
FIG. 1 is a partial perspective view of a grain distribution system which delivers grain into a grain dryer bin.
Figure 2:
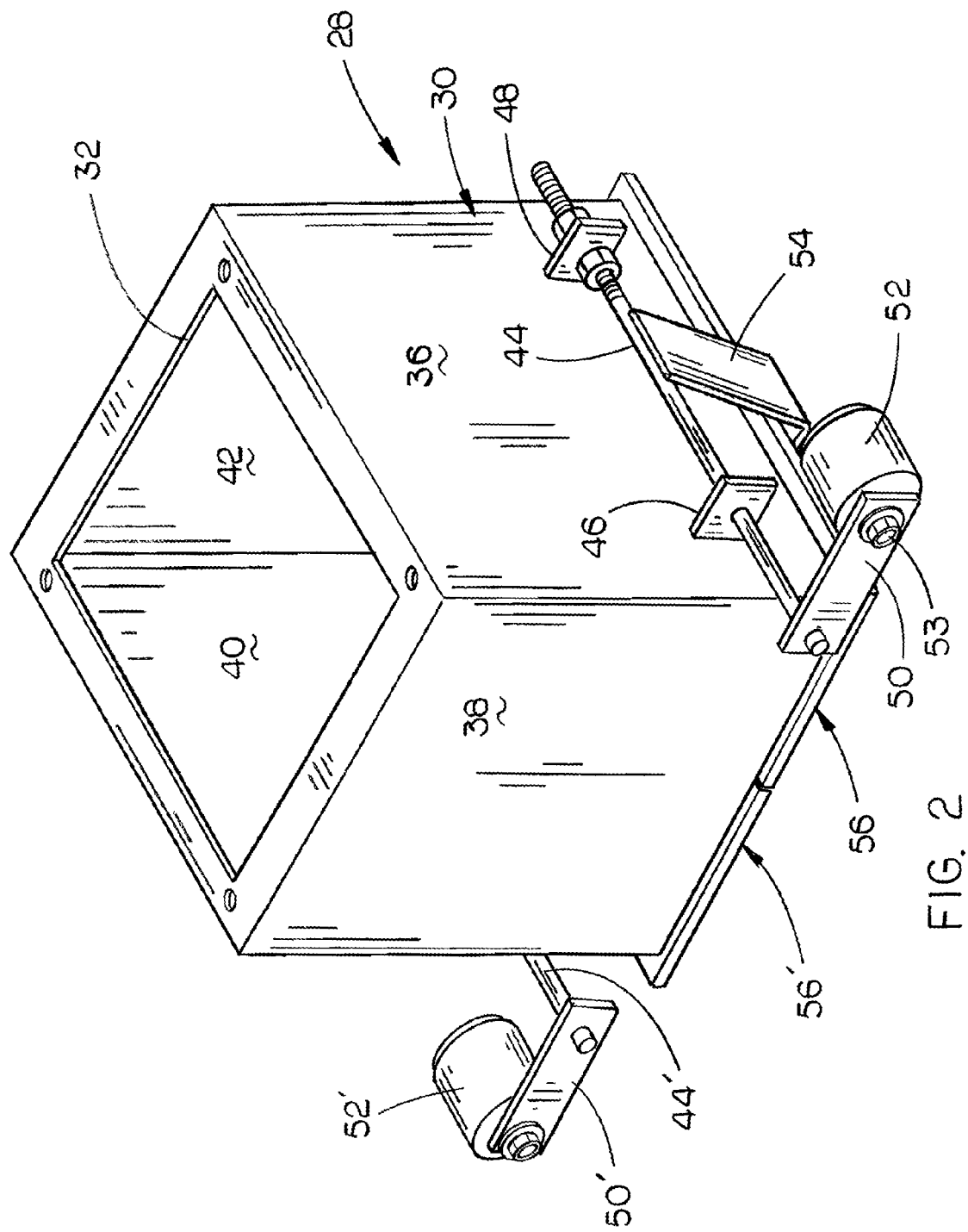
FIG. 2 is a perspective view of the gate valve of this invention.
Figure 3:
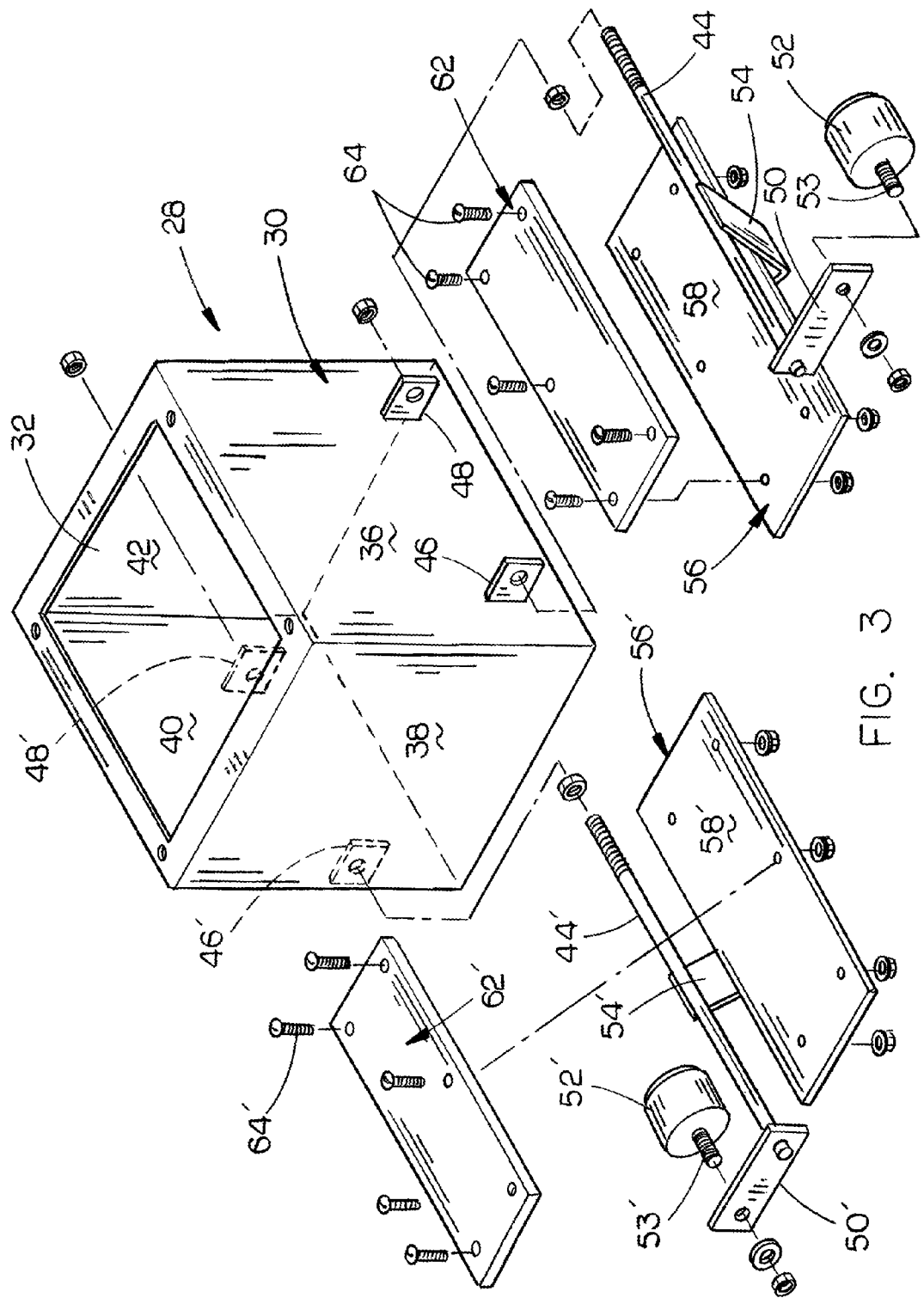
FIG. 3 is an exploded perspective view of the gate valve of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional grain storage facility which includes one or more grain bins 12, each of which has an open upper end 14 which is normally closed by a lid or cover 16. The grain bin may be a dryer bin, an aerator bin or a conventional bin. Lid 16 includes an opening 18 formed therein which is usually centrally positioned in lid 16. A flanged connector 20 is secured to the upper side of lid 16 and which has an opening 22 formed therein which communicates with opening 18 in lid 16. The roof of the bin 12 has a plurality of air vent members 23 formed therein. The numeral 24 refers to a conventional grain discharge spout which extends from a conventional grain distributor 26 which is in communication with a source of grain. The discharge end of spout 24 usually is in communication with an adjustable deadhead box 25 which is in communication with the opening 22 in flange connector 20 and is secured to the flange connector 20 in conventional fashion. In some cases, the deadhead box 25 is not utilized. In those situations, the discharge end of the spout 24 is in communication with the opening 22.

The numeral 28 refers to the gate valve apparatus of this invention. Gate valve 28 includes a hollow housing 30 which has an open upper end 32 and an open lower end 34. Housing 30 may have a square cross-section, a rectangular cross-section or a cylindrical configuration.

The upper end 32 of housing 30 is bolted or otherwise secured to the underside of lid 16 by bolts 35 so that the interior of housing 30 is in communication with opening 18 of lid 16. For purposes of description, housing 30 will be described as having side walls 36, 38, 40 and 42.

A horizontally disposed pivot shaft or rod 44 is pivotally mounted in brackets 46 and 48 which are welded to the outer side of side wall 36 of housing 30. Plate member 50 has its inner end welded to shaft 44 outwardly of bracket 46. A heavy counter-weight 52, comprised of metal such as iron, steel or lead, is secured to the outer end of plate member 50 by bolt 53. One end of arm or plate 54 is welded or otherwise secured to shaft 44 between brackets 46 and 48. The other end of plate 54 is secured to a rectangular valve member 56 by welding. Valve member 56 will be described as having an inner side 58 and an outer side 60. A wear resistant plate member 62 comprised of plastic or the like is positioned at the inner side 58 of valve member 56 and is secured to valve member 56 thereto by bolts 64.

Valve member 56 is pivotally movable between a normally closed position and an open position. The counter-weight 52 yieldably maintains valve member 56 in its closed position. When in its closed position of FIG. 4, valve member 56 closes one-half of the open lower end 34 of housing 30.

A horizontally disposed pivot shaft or rod 44' is pivotally mounted in brackets 46' and 48' which are welded to the outer side of side wall 40 of housing 30. Plate member 50' has its inner end welded to shaft 44' outwardly of bracket 46'. A heavy counter-weight 52', comprised of metal such as iron, steel or lead, is secured to the outer end of plate member 50' by bolt 53'. One end of arm or plate 54' is welded or otherwise secured to shaft 44' between brackets 46' and 48'. The other end of plate 54' is secured to a rectangular valve member 56' by welding. Valve member 56' will be described as having an inner side 58' and an outer side 60'. A wear resistant plate member 62' comprised of plastic or the like is positioned at the inner side 58' of valve member 56' and is secured to valve member 56' by bolts 64'.

Valve member 56' is pivotally movable between a normally closed position and an open position. The counter-weight 52' yieldably maintains valve member 56' in its closed position. When in its closed position, valve member 56' closes one-half of the open lower end 34 of housing 30.

Figure 4:
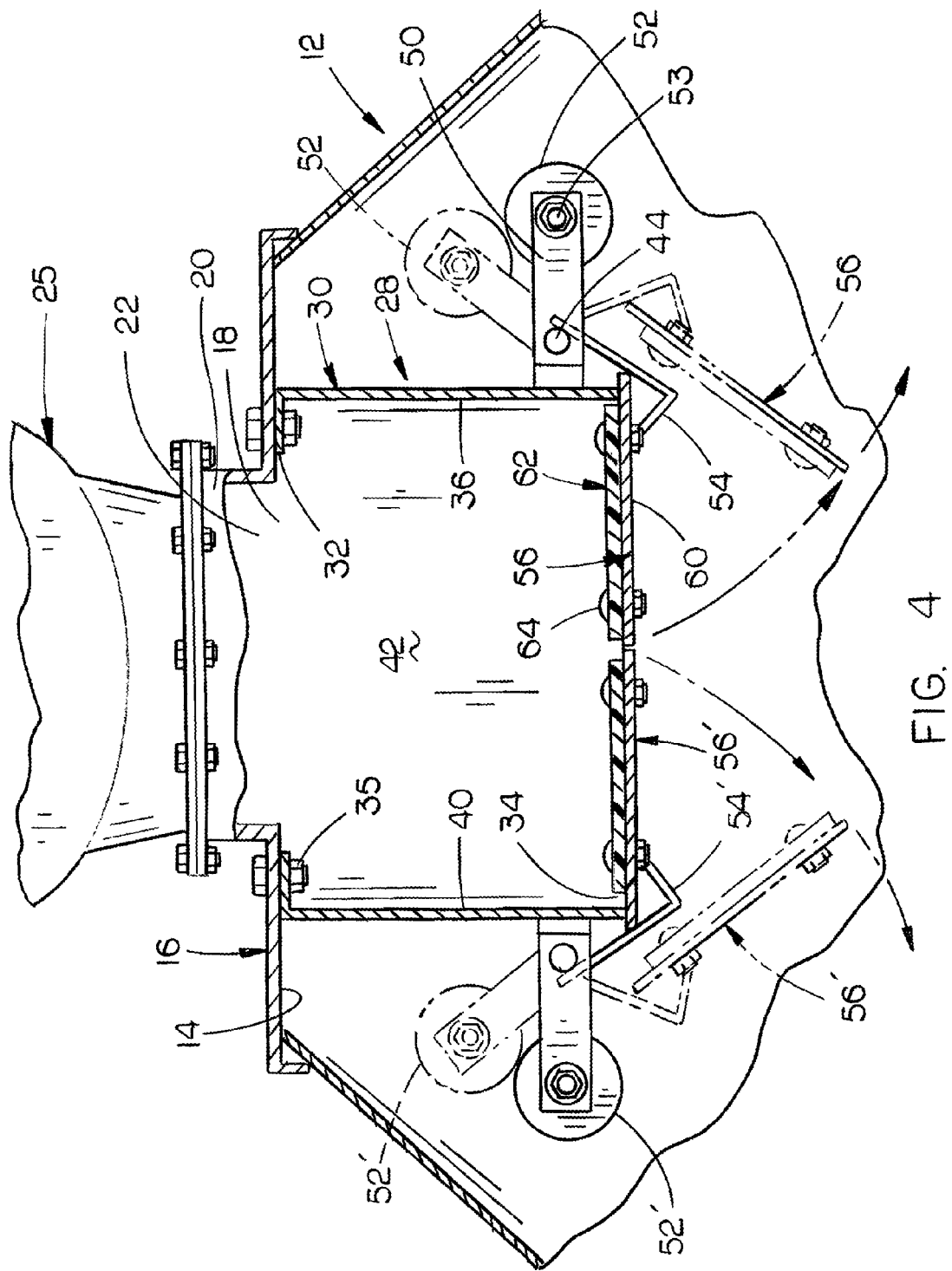
FIG. 4 is a partial sectional view illustrating the gate valve of this invention mounted in the upper end of a grain dryer bin with the broken lines illustrating the valve assembly of this invention in an open position.
Figure 5:
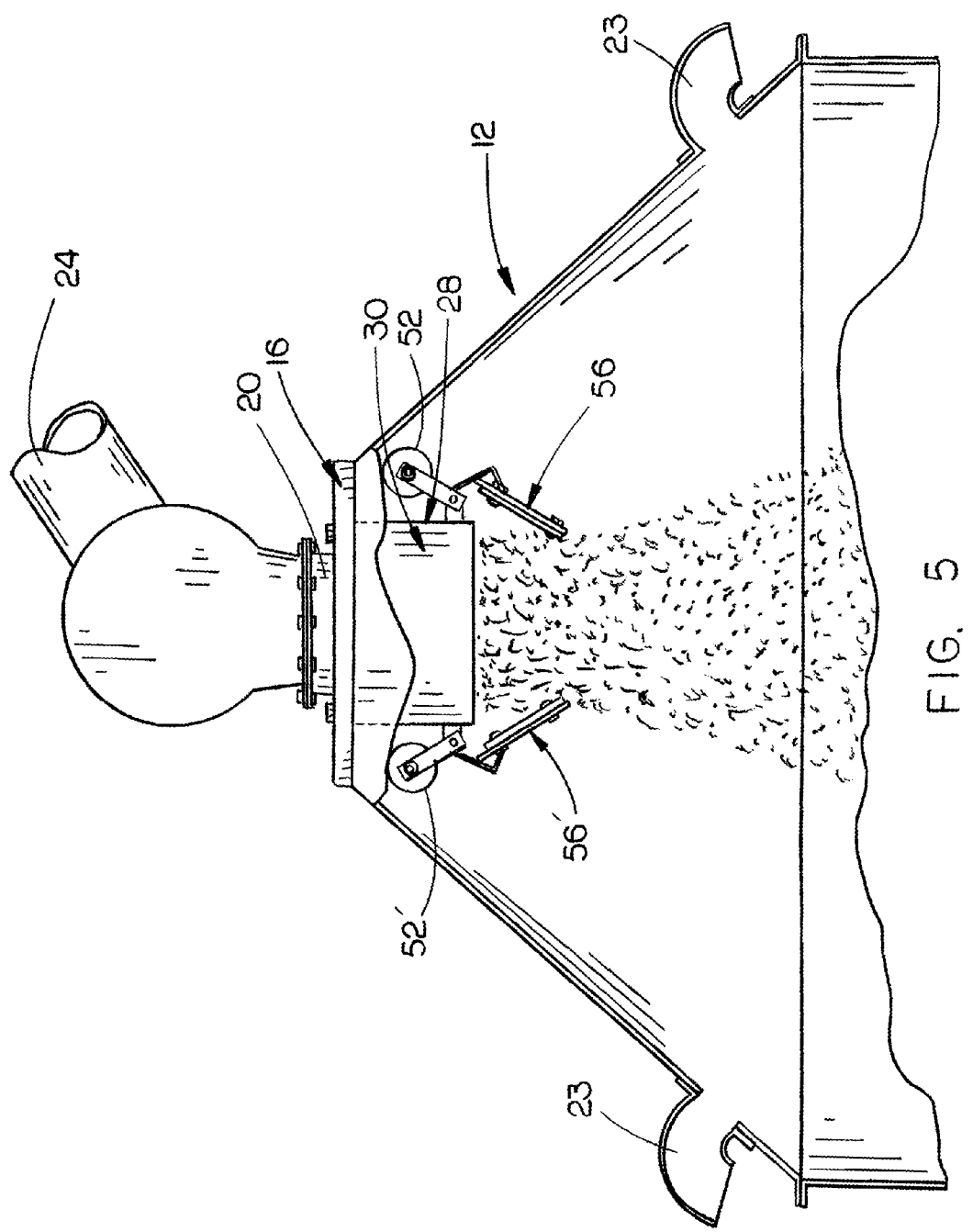
FIG. 5 is a side view of the valve assembly of this invention in an open position with a portion of the grain dryer bin cut away to more fully illustrate the invention.
Figure 6:
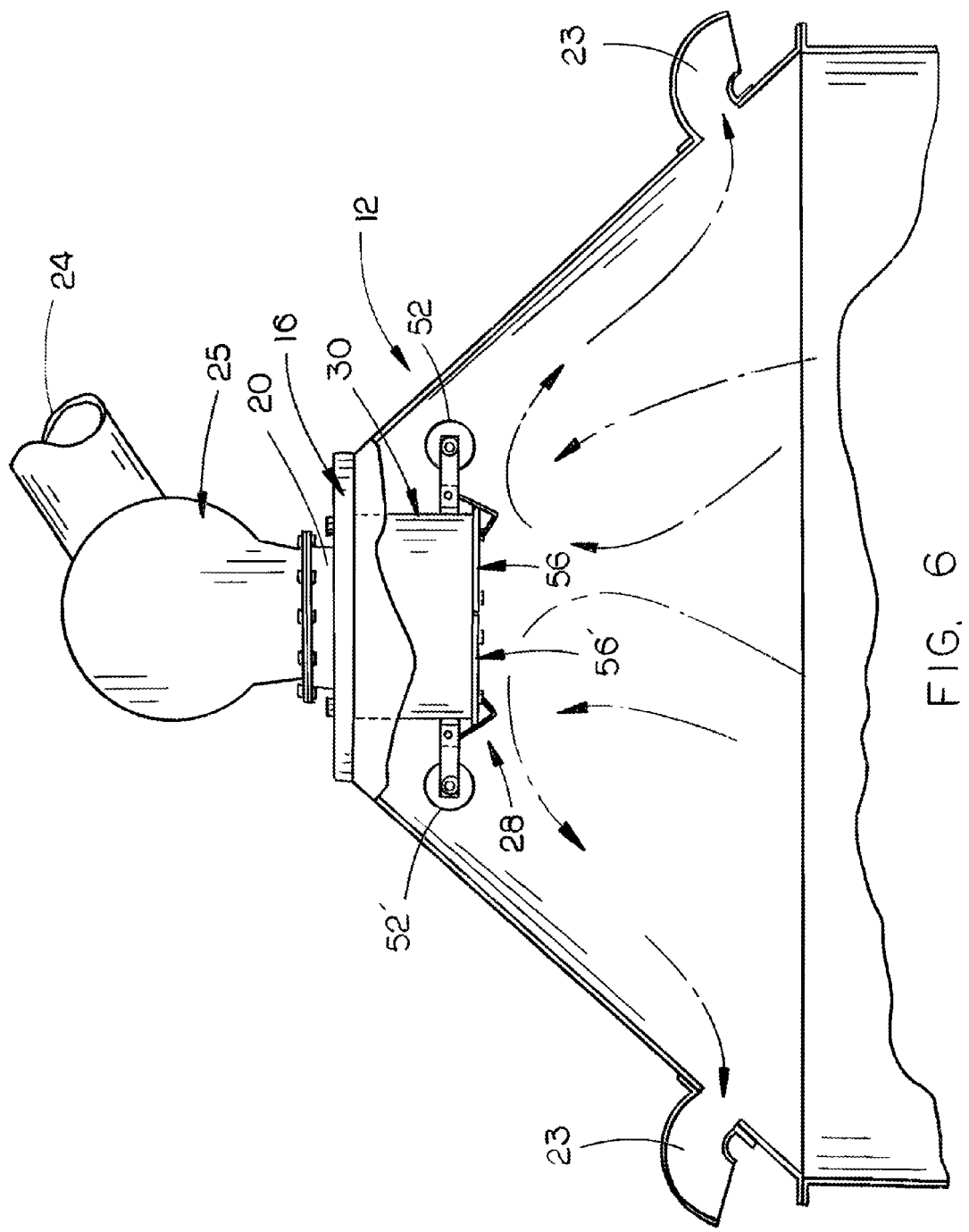
FIG. 6 is a side view similar to FIG. 5 except that the valve assembly is in a closed position.

The valve members 56 and 56' will be in their normally closed positions of FIG. 4 due to the counter-weights 52 and 52' unless grain is being delivered to the bin 12. When in their closed positions, the valve members 56 and 56' prevent warm moist air from passing upwardly from the interior of the grain bin 12 into the grain discharge spout 24 or the adjustable deadhead box 25. The closure of the valve members 56 and 56' prevents the warm moist air from condensing on the inside of the box 25 or the discharge spout 24. When grain is being delivered to the bin 12 by the spout 24 or the deadhead box 25, as seen in FIG. 5, the weight of the incoming grain impinges on the valve members 56 and 56' to pivotally move the valve members 56 and 56' to their open positions against the forces of the counter-weights 52 and 52'. As soon as the flow of grain is halted, the valve members 56 and 56' are moved to their closed positions by the counter-weights 52 and 52'. The valve members 56 and 56', when in their closed positions of FIG. 6, prevent the warm moist air passing upwardly from the grain in bin 12 from passing into the interior of the deadhead box 25 or the spout 24 as previously described.

Although it is preferred that the valve members 56 and 56' are yieldably maintained in their closed positions by the counter-weights 52 and 52', the counter-weights 52 and 52' could be replaced by torsion springs or the like.

Although it is preferred that the gate valve apparatus 28 of this invention be secured to the lid 16, it is possible that the apparatus 28 could be separated from lid 16 and held in position below the lid 16 below the opening 18 by suitable supporting structure.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A gate valve for use with a grain bin including a conical-shaped roof having an upper end and a lower end with the conical-shaped roof having a plurality of spaced-apart vent openings formed therein below the upper end of the conical-shaped roof and with the conical-shaped roof having a grain inlet opening formed in the upper end thereof and which has a lid, with upper and lower sides, extending over the grain inlet opening with the lid having an opening formed therein which is in communication with a grain discharge spout or deadhead box with the grain discharge spout or deadhead box being in communication with a source of grain from a grain distributor of the like, comprising:

a hollow housing including a vertically disposed first side wall having upper and lower ends, a vertically disposed second side wall having upper and lower ends, a vertically disposed third side wall having upper and lower ends, a vertically disposed fourth side wall having upper and lower ends, an open upper end, and an open lower end;

said first, second, third and fourth side walls having inner and outer sides;

said housing being secured to and positioned at the lower side of the lid whereby said open upper end of said housing is in communication with the opening in the lid;

a horizontally disposed first pivot shaft pivotally mounted at said outer side of said first side wall of said housing at said lower end of said first side wall;

said first pivot shaft being pivotally movable between first and second positions;

a counter-weight operatively secured to said first pivot shaft which normally maintains said first pivot shaft in said first position;

a first valve member operatively secured to said first pivot shaft;

said first valve member being in a first closed position when said first pivot shaft is in said first position and being in a second open position when said first pivot shaft is in said second position;

said first valve member closing one-half of said open lower end of said housing when said first pivot shaft is in said first position and said first valve member is in said closed position;

a horizontally disposed second pivot shaft pivotally mounted at said outer side of said third side wall of said housing at said lower end of said third side wall;

said second pivot shaft being pivotally movable between first and second positions;

a counter-weight operatively secured to said second pivot shaft which normally maintains said second pivot shaft in said first position;

a second valve member operatively secured to said second pivot shaft;

said second valve member being in a first closed position when said second pivot shaft is in said first position and being in a second open position when said second pivot shaft is in said second position;

said second valve member closing one-half of said open lower end of said housing when said second pivot shaft is in said first position and said second valve member is in said first closed position; and said first and second valve members, when in their said closed positions, preventing air from a interior of the grain bin from passing outwardly and upwardly through the opening in the lid whereby the air in the grain bin will pass outwardly through the vent openings.

2. The apparatus of claim 1 wherein each of said first and second valve members have inner and outer sides and wherein a plastic plate member is secured to the inner side of each of said first and second valve members.

3. The apparatus of claim 1 wherein said housing has a square cross-section.

4. The apparatus of claim 1 wherein said housing has a rectangular cross-section.

* * * * *